US009009354B2

(12) United States Patent
Schmitt et al.

(10) Patent No.: US 9,009,354 B2
(45) Date of Patent: Apr. 14, 2015

(54) SERVICES AND MANAGEMENT LAYER FOR DIVERSE DATA CONNECTIONS

(71) Applicants: Michael Schmitt, Walldorf (DE); Timm Falter, Walldorf (DE)

(72) Inventors: Michael Schmitt, Walldorf (DE); Timm Falter, Walldorf (DE)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 13/721,506

(22) Filed: Dec. 20, 2012

(65) Prior Publication Data
US 2014/0181322 A1 Jun. 26, 2014

(51) Int. Cl.
G06F 15/16 (2006.01)
H04L 29/08 (2006.01)
H04L 29/12 (2006.01)

(52) U.S. Cl.
CPC .......... H04L 29/08027 (2013.01); *H04L 67/02* (2013.01); *H04L 29/08657* (2013.01); *H04L 61/1535* (2013.01); *H04L 67/00* (2013.01); H04L 67/2823 (2013.01); *H04L 67/2895* (2013.01); *H04L 67/32* (2013.01); H04L 67/327 (2013.01)

(58) Field of Classification Search
CPC .............. H04L 29/08027; H04L 61/00; H04L 61/1535; H04L 29/08657; H04L 67/02; H04L 67/00; H04L 29/0827; H04L 67/2895; H04L 67/32; G06F 11/0706; G06F 21/50
See application file for complete search history.

(56) References Cited

U.S. PATENT DOCUMENTS

| 6,134,618 | A | 10/2000 | Hebert |
| 6,507,589 | B1 | 1/2003 | Ramasubramani et al. |
| 8,204,992 | B2 * | 6/2012 | Arora et al. .................... 709/226 |
| 8,336,089 | B1 * | 12/2012 | Ahmed et al. ..................... 726/7 |
| 2011/0134804 | A1 * | 6/2011 | Maes ............................. 370/259 |
| 2011/0200052 | A1 * | 8/2011 | Mungo et al. ................. 370/401 |
| 2011/0265168 | A1 * | 10/2011 | Lucovsky et al. ................ 726/7 |
| 2012/0246334 | A1 | 9/2012 | Yang et al. |
| 2013/0173734 | A1 * | 7/2013 | Oteiza Lacalle et al. ...... 709/207 |

OTHER PUBLICATIONS

European Search Report for EP Application No. 13 00 3813 mailed Feb. 17, 2014, 6 pages.

* cited by examiner

Primary Examiner — Krisna Lim
(74) Attorney, Agent, or Firm — Brake Hughes Bellermann LLP

(57) ABSTRACT

A method relates to quality of services and management of diverse data connections to and from an application launched on a computing platform. The diverse types of data connections to and from the application may include, for example, one or more of HTTP, Web Services, OData/REST, OData/HTTP, SAP RFC, and SAP ALE types of data connections. The method includes providing a layer, in the computing platform, for quality of services and management of diverse types of data connections to and from the application and providing a common entry point to receive data destined for external receivers over the diverse types of data connections to and from the application.

20 Claims, 6 Drawing Sheets

SERVICES AND MANAGEMENT LAYER FOR DIVERSE DATA CONNECTIONS

BACKGROUND

A computing platform can be simply defined as a place to launch application software. A computing platform can include a hardware architecture and a software framework (including application frameworks) designed to allow application software to run. The computing platform provides a software developer certainty that logic code (or an application) will run consistently on any of a variety of systems as long as they support the computing platform. Logic code includes byte code, source code, and machine code.

Applications running on a computing platform may interact or exchange data with other computing elements or entities (e.g., databases, other applications, other computing platforms or systems, etc.) via specific programmed data connections. A data connection to and from an application may be of a specific connectivity type (e.g., HTTP, Web Services, OData/REST, OData/HTTP, SAP RFC, SAP ALE, etc.). Each specific data connection type may have its own programming model (e.g., for configuration, runtime, monitoring, addressing aspects, error handling, etc.).

In practice, applications running on a computing platform can use diverse connectivity types and programming models. The diversity or variety in connectivity types and programming models can add complexity to application integration and connectivity administration on the computing platform.

A particular data connection type for an application may be selected by an application developer based, for example, on consideration of the advantages and disadvantages of the particular connectivity type. The incoming data coming in via a data connection of one connectivity type is mostly processed within the application by entities of the same connectivity type (e.g., incoming RFC data is often pre-processed in a receiving RFC function module). As a consequence, application logic has to be rewritten by application developers each time a new or additional data connection type is to be supported by the application. Several application programming interfaces (APIs), for example, APIs for receiving data and containing at least parts of the business logic) may have to be rewritten to be kept up to date.

Computing platform frameworks with a view to simplify application integration and connectivity administration should be considered.

SUMMARY

A system includes a processor, a memory, and a computing platform based on the processor and memory. The computing platform provides one or more services and processes to an application launched thereon. The application may have a set of data connections to other entities, databases or applications. The set of data connections may include different data connections of different specific connectivity types (e.g., HTTP, Web Services, OData/REST, OData/HTTP, SAP RFC, SAP ALE connectivity types, etc.). It will be understood that the set of data connections of different specific connectivity types may include several data connections of a same connectivity type. Further, it will be understood that terms "type of data connection", "data connection type", or "connection type", as used herein, refer to the specific connectivity type of a data connection.

According to one general aspect, the computing platform includes a layer for quality of services and management of data connections to and from the application. The data connections to and from the application can include one or more data connections of different specific connectivity types.

In one aspect, the layer for quality of services and management provides one or more common services including at least one of error handling, monitoring, asynchronous handling, and addressing for the diverse types of data connections to the application.

In another aspect, the layer for quality of services and management includes a common entry point to receive data destined for external receivers over the data connections of diverse connectivity types to and from the application. The layer for quality of services and management includes a respective message assembler module for each of the diverse connectivity types of data connections to and from the application. The message assembler module assembles data received at the common entry point as a message for transmission to a particular external receiver according to the type of data connection to the particular external receiver.

In yet another aspect, the layer for quality of services and management includes at least one addressable data-handover point to hand over received data to a recipient on the computing platform after mapping received data to a common data structure or format.

In a further aspect, the layer for quality of services and management includes modules configured to establish semantic addresses for a sender and a receiver of a data message sent or received over a data connection to the computing platform.

According to one general aspect, a method includes providing a layer for quality of services and management of data connections of diverse connectivity types to and from an application on a computing platform, and providing a common entry point to receive data destined for external receivers over the data connections of diverse connectivity types to and from the application.

In one aspect, the method includes providing a respective message assembler module for each of the diverse connectivity types of data connections to and from the application. The message assembler module is configured to assemble data received at the common entry point as a message for transmission to a particular external receiver according to the connectivity type of the data connection to the particular external receiver.

In another aspect, the method includes configuring the layer for quality of services and management to receive data over diverse types of data connections from external senders and to map the data received over the data connections of diverse connectivity types to a common data structure or format.

In yet another aspect, the method includes providing at least one addressable data-handover point to hand over data to a recipient on the computing platform after mapping the received data to the common data structure or format.

In a further aspect, the method includes providing modules configured to establish semantic addresses for a sender and a receiver of a data message sent or received over a data connection to the computing platform independent of a connectivity type of the data connection.

According to one general aspect, a non-transitory computer readable medium includes instructions capable of being executed on a computer system. The instructions when executed on the computer system generate a layer for quality of services and management of data connections of diverse connectivity types to and from an application on a computing platform, and a common entry point to receive data destined for external receivers over the data connections of diverse connectivity types to and from the application.

In one aspect, the instructions when executed on the computer system further generate a respective message assembler module for each of the diverse connectivity types of data connections to and from the application. The message assembler module can assemble data received at the common entry point as a message for transmission to a particular external receiver according to the connectivity type of the data connection to the particular external receiver.

In another aspect, the instructions when executed on the computer system configure the layer for quality of services and management to receive data over data connections of diverse connectivity types from external senders and to map the data received over the data connections of diverse connectivity types to a common data structure or format.

The details of one or more implementations are set forth in the accompanying drawings and the description below. Other features will be apparent from the description and drawings, and from the claims.

DETAILED DESCRIPTION

Figure 5:
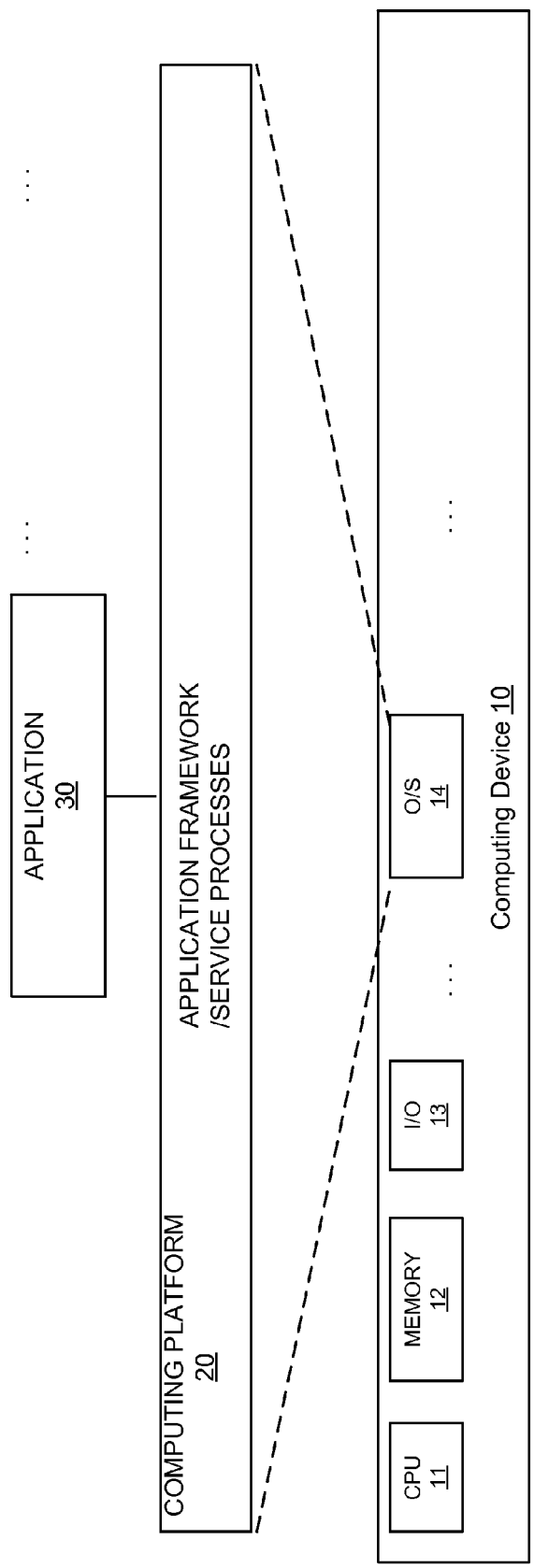
FIG. 5 is a schematic block diagram illustration of a computing platform supported by computing machine.

A computer system may used to launch applications (e.g., business applications) that connect to or interact with other applications, databases, servers, storage, computer systems or entities, etc. The computer system may include a computing platform hosted or supported by one or more physical or virtual computing machines, which may, for example, be deployed in a networked arrangement. The computing platform may, for example, include an operating system which governs hardware components (e.g., processor, memory, keypad, display, network cards, etc.) and other components and processes of a host computing machine. FIG. 5 schematically shows an example computing platform 20 supported by computing machine 10, which may be a representative of a physical or virtual machine in a networked computer system. Host computing machine 10 may include a CPU 11, a memory 12, I/O 13 and O/S 14. CPU 11 may be any general processor, and memory 12 may be one or more storage devices configured to store data used by CPU 11 to perform certain functions.

Computing platform 20 may provide an application framework and processes or services for applications (e.g., business application 30) launched thereon. Application 30 in its functioning may connect to other external entities (e.g., applications, databases, systems, etc.), for example, to send, receive or exchange data. A custom or industry-standard data connection protocol for a "connectivity" type (e.g., HTTP, Web Services, OData/REST, OData/HTTP, SAP RFC, SAP ALE, etc.) may be used for a data connection between sending and receiving entities.

Under a computing platform framework or programming model, a common Connectivity Quality-of-Services and Management Layer ("common management layer") for data connections of diverse connectivity types is provided in a computing platform, in accordance with the principles of the disclosure herein.

The common management layer is configured to provide one or more common services (e.g., error handling, monitoring, asynchronous handling, addressing, etc.) to data connections of diverse connectivity types that may be used or required by applications hosted on the computing platform. Two scenarios for the common services may be envisioned—a first scenario in which applications hosted on the computing platform send data over the data connections and a second scenario in which applications hosted on the computing platform receive data over the data connections.

Sending-Data Scenario

Data in the sending-data scenario may originate from an application environment or from a database environment. For services in this scenario, the common management layer may have a common entry point to receive data (and data attributes) destined for external receivers from sending entities, which may be databases coupled to the computing platform or applications hosted on the computing platform. The data attributes that are handed over to the common management layer at the common entry point by a sending entity may include data attributes such as whether the data connection is synchronous, asynchronous, reliable, etc. Further, the data attributes that are handed over may include direct or indirect identification of the type of data connection to an intended receiver of the data.

The common management layer may be configured to process the data and data attributes received at the common entry point to assemble a message consistent with the type of data connection to the intended external receiver of the data. The assembled message may be sent out to the intended external receiver of the data from a respective basis layer or stub for the connectivity type in the common management layer. The common entry point may be the same irrespective of whether the message is assembled from data from an application environment or from a database environment.

Figure 1:
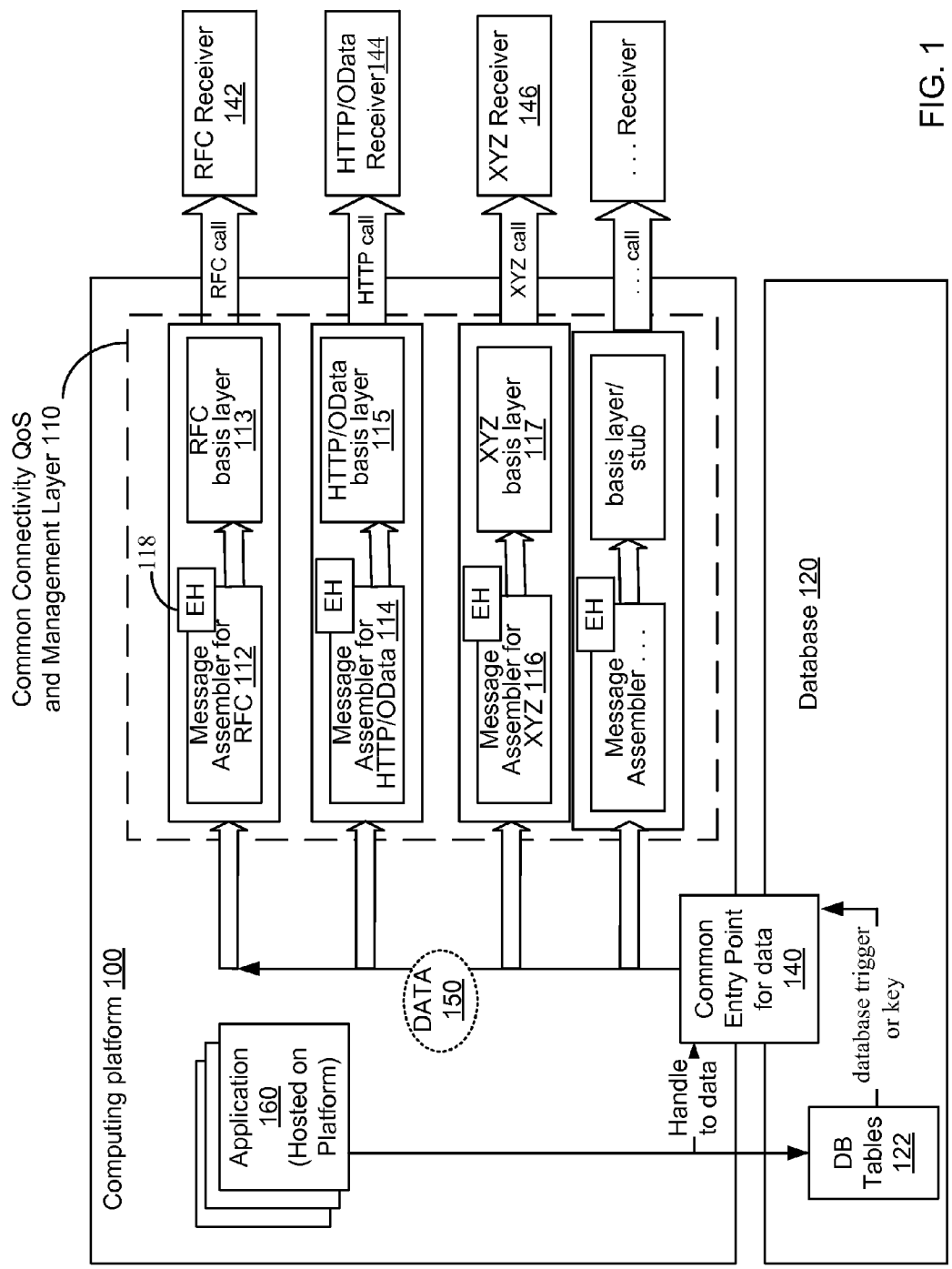
FIG. 1 is a block diagram illustration of service and process elements of an example computing platform that may be used in a sending-data scenario, in accordance with the principles of the disclosure herein.

FIG. 1 is a block diagram illustration of service and process elements of an example computing platform 100 that may be used in the sending-data scenario, in accordance with the principles of the disclosure herein. As shown, computing platform 100 may be coupled to a database 120/database table 122. Further, computing platform 100 may host one or more applications (e.g., application 160). The one or more applications may be configured, for example, to process or access data stored in database 120/database tables 122.

Computing platform 100 may include a Connectivity Quality-of-Services and Management Layer 110 ("common management layer 110") that is configured to commonly administer sending data from the computing platform to various external receivers (e.g., RFC receiver 142, HTTP/OData receiver 144, XYZ receiver 146, etc.) over data connections or channels of diverse connectivity types. Computing platform 100 may include a common entry point 140 at which data 150, which is to be sent to any of the various receivers, is handed over to common management layer 110 by a sending entity (e.g., an application or a database). As shown in the figure, handing over of data 150 may involve, for example, the application 160 providing a handle (e.g., an access key, token or other identifier) to the data to common management layer 110 at common entry point 140. Alternatively or additionally, handing over of data 150 by database 120 may involve handing over a database trigger, key or similar data-identifier to common management layer 110 at common entry point 140. It will be understood that handing over of data 150 may also involve handing over of associated data attributes including, for example, an identification of an intended data receiver and/or a data connection type.

Common management layer 110 may include a respective message assembly module (e.g., message assembler module 112, message assembler module 114, message assembler module 116, etc.) feeding a respective basis layer or stub (e.g., RFC basis layer 113, HTTP/OData basis layer 115, XYZ basis layer 117, etc.) for each of a variety of connection types that may be supported by computing platform 100. A particular basis layer or stub may define the computing platform's interface to a receiver for the particular data connection type. Common management layer 110 may be configured to assemble a message based on data 150 for transmission to a particular receiver using the respective message assembler module 112, and to further send the assembled message to the particular receiver using the basis layer or stub corresponding to the data connection type to the particular receiver.

Message assembler modules 112-116 may include enhancement hook points 118 that are configured for extensibility (e.g., after message assembly). These enhancement hook points 118 may be used to optionally add supplemental data to messages that are assembled based on data 150. The supplemental data added to the messages may be obtained by direct database access without application involvement, such as an application check.

Since common management layer 110 provides connection interfaces and prepares the messages for data connections of various connectivity types, it may not be necessary to customize applications (e.g., application 160) with individual logic or application programming interfaces (APIs) for each of the various connectivity types. Further, a data connection of a new or future connectivity type may be serviced, for example, by including an appropriate message assembler module in common management layer 110, without a need to program or modify application 160 itself.

Receiving-Data Scenario

In the receiving-data scenario, data destined for an application or database on the computing platform may be received on the computing platform via data connections of any of a variety of connectivity types. Each data connection type may have its own programming model. For services in this scenario, the computing platform may have a single data-handover point (or "universal API") for handing data received from external senders to an application hosted on the computing platform or to a database linked to the computing platform. The single data-handover point or universal API may be commonly used for a specific application for data received from any of several external receivers, independent of the connectivity type of the data connection or channel over which the data received in the computing platform. It may be expected that the data received in the computing platform may be prepared or conditioned differently according to the type and programming model of the connection or channel over which the data is received. The common management layer may be configured to map the differently prepared or conditioned data received over data connections of different connectivity types to conform to the universal API.

The common management layer may provide common Quality of Services (e.g., error handling, monitoring, asynchronous handling etc.) for all of the diverse connectivity types supported by the computing platform. With implementation of the common management layer, a need to provide specific service tools (e.g., administration tools, error handling tools, monitoring tools, configuration tools, and own runtime (i.e. execution object), etc.) separately for each connectivity type used for data connections by an application may be avoided. The common management layer may, in a central environment, commonly provide equivalent services or functionality for all of the data connections and connectivity types used by the data connections by the application.

Figure 2:
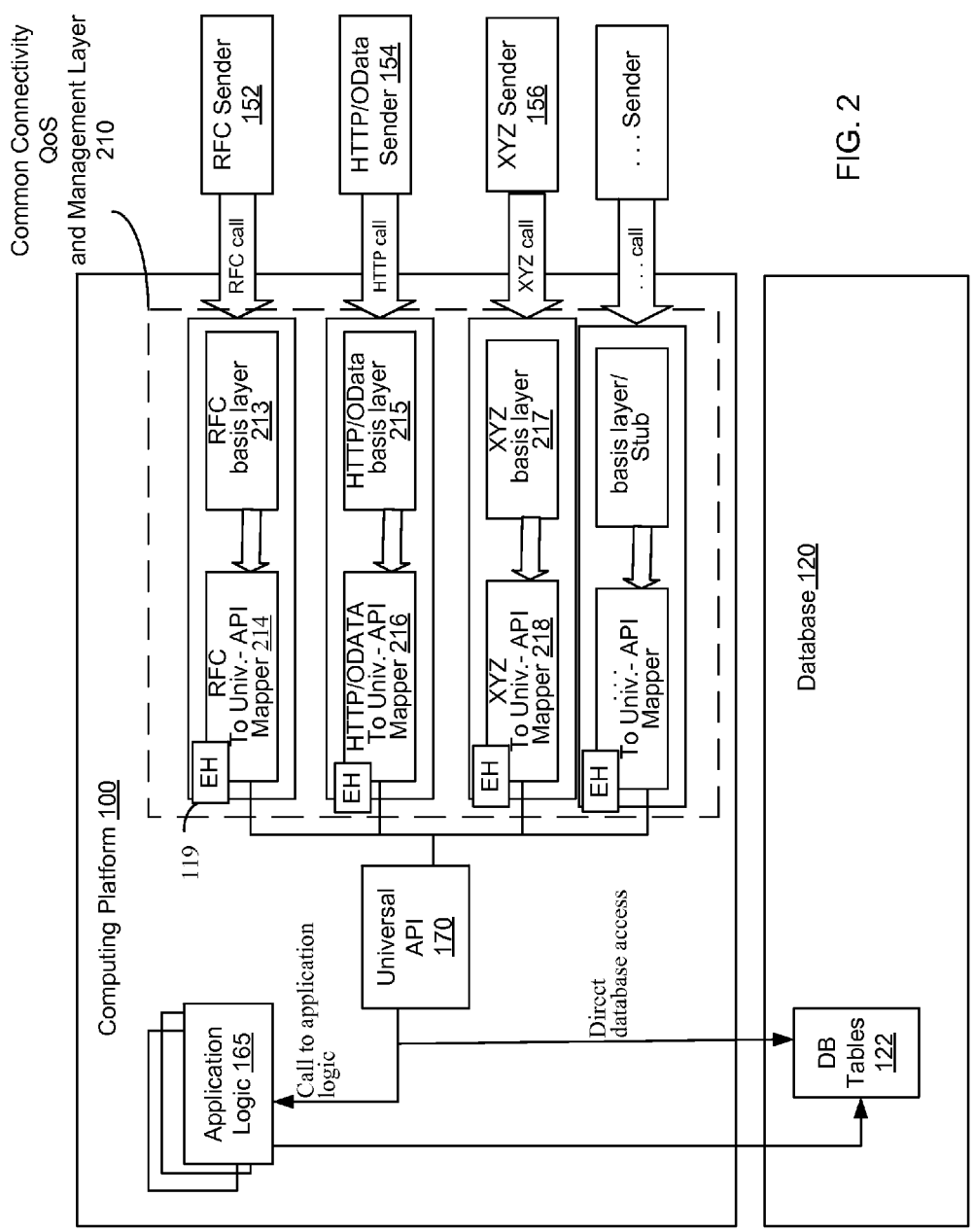
FIG. 2 is a block diagram illustration of service and process elements of the example computing platform of FIG. 1 that may be used in a receiving-data scenario, in accordance with the principles of the disclosure herein.

FIG. 2 is a schematic illustration of the service and process elements of example computing platform 100 that may be used in the receiving-data scenario, in accordance with the principles of the disclosure herein. As shown previously in FIG. 1, computing platform 100 may be coupled to a database 120/database table 122. Further, computing platform 100 may host one or more applications (e.g., application 160 in FIG. 1, which is represented in FIG. 2 as application logic 165).

Computing platform 100 may include a Connectivity Quality-of-Services and Management Layer 210 ("common management layer 210") that is configured to commonly administer data-receiving on the computing platform over data connections of diverse connectivity types from various external senders (e.g., RFC sender 152, HTTP/ODATA sender 154, XYZ sender 156, etc.). Common management layer 210 may include a respective basis layer or module (e.g., RFC basis layer 213, HTTP/ODATA basis layer 215, XYZ basis layer 217, etc.) as a partner data receiving-module on computing platform 100 for each of a variety external sender data connection types that may be supported by computing platform 100. Further, common management layer 210 may include a respective data mapping module (e.g., RFC to Univ-API mapper 214, HTTP/ODATA to Univ-API mapper 216, XYZ to Univ-API mapper 218, etc.) for each of the partner data receiving-modules 213-217. The data mapping modules may be configured to map the data received over data connections of diverse connectivity types by the various data receiving-modules to a common data structure or format for further processing or use on computing platform 100. The common data structure or format may, for example, be compatible with at least one application-specific application programming interface (e.g., API 170) of the applications (e.g., application 160) hosted on computing platform 100.

Data mapping modules 214-218 may further include enhancement hook points 119, which may be counterparts of enhancement hook points (e.g., enhancement hook points 118) on the sender side. Enhancement hook points 119 may be configured to retrieve enhanced data, which requires separate handling that is not provided by application logic 165, from the received messages. Enhancement hook points 119 may be disposed of after the connectivity type-specific data mapping modules 214-218 but before the at least one API 170.

Further, computing platform 100 may include at least one addressable data-handover point (e.g., an application-specific API 170) by which data that is sent over by any of the various senders can be handed over by common management layer 210 to designated recipients (e.g., application 160, database table 122) after it is mapped to the common data structure or format. As shown in the figure, the mapped data may be handed over from application-specific API 170, for example, by direct database access to database 120 or by a call to application logic 165.

Computing platform 100, which may support a variety of data connection types and/or host variety of applications may be manually configured with parameters or settings that may indicate which specific data mapping module should be called for a data connection of a specific connectivity type or external sender and/or which application-specific API should be called, for example, when data is received from an external sender.

Since common management layer 210 provides a common application-specific API (e.g., API 170) for the various data connection types, it may not be necessary to customize application 160, which may be hosted on the computing platform 100, with individual logic or application programming interfaces for each of the various data connection types. Further, a new or future data connection type may be serviced, for example, by including an appropriate data-mapping module in the common management layer 110, without a need to change or rewrite application 160 or application logic 165.

Figure 3:
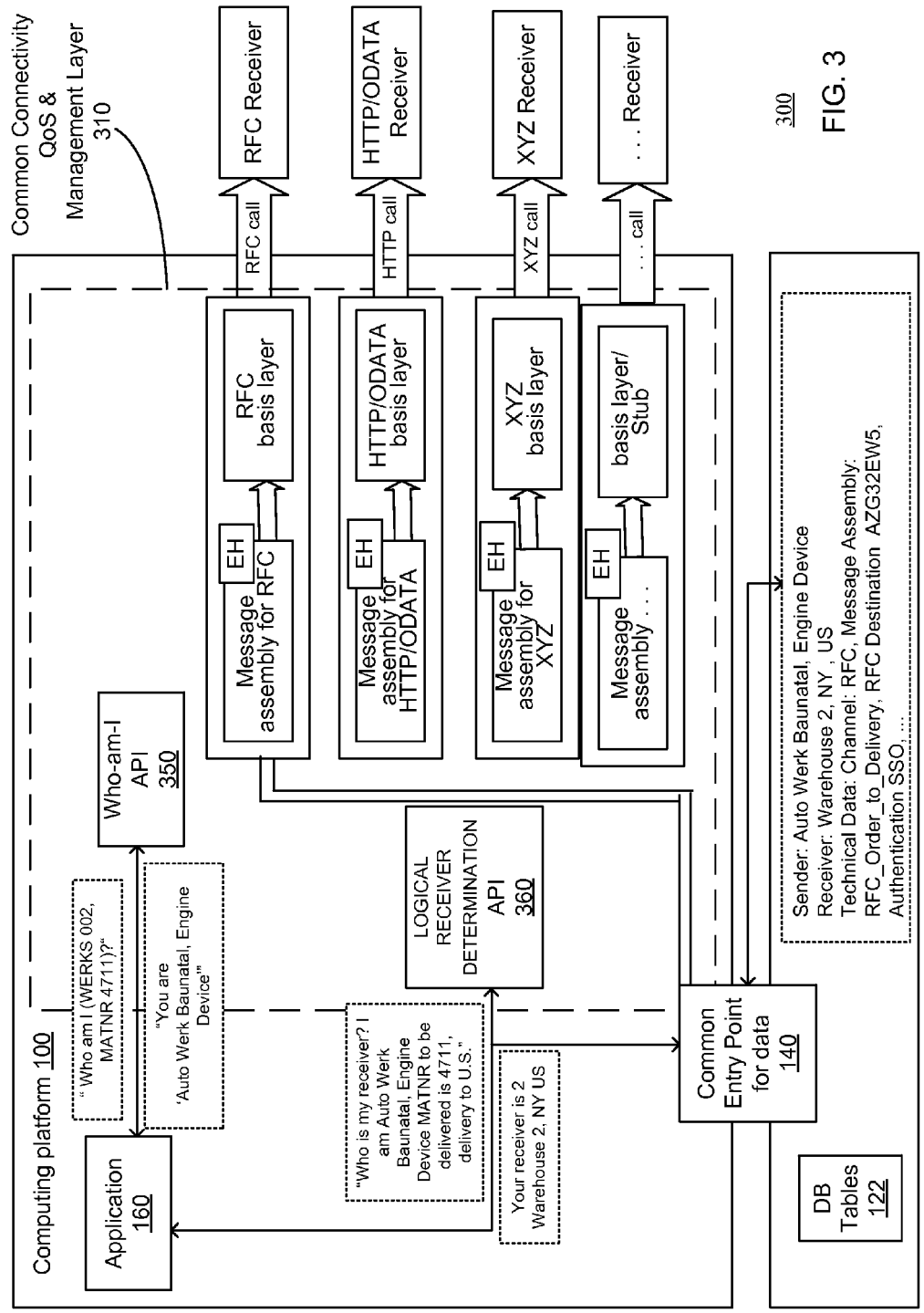
FIG. 3 is a block diagram illustration of an example implementation of a semantic addressing approach on the computing platform of FIG. 1 in the sending-data scenario, in accordance with principles of the disclosure herein.
Figure 4:
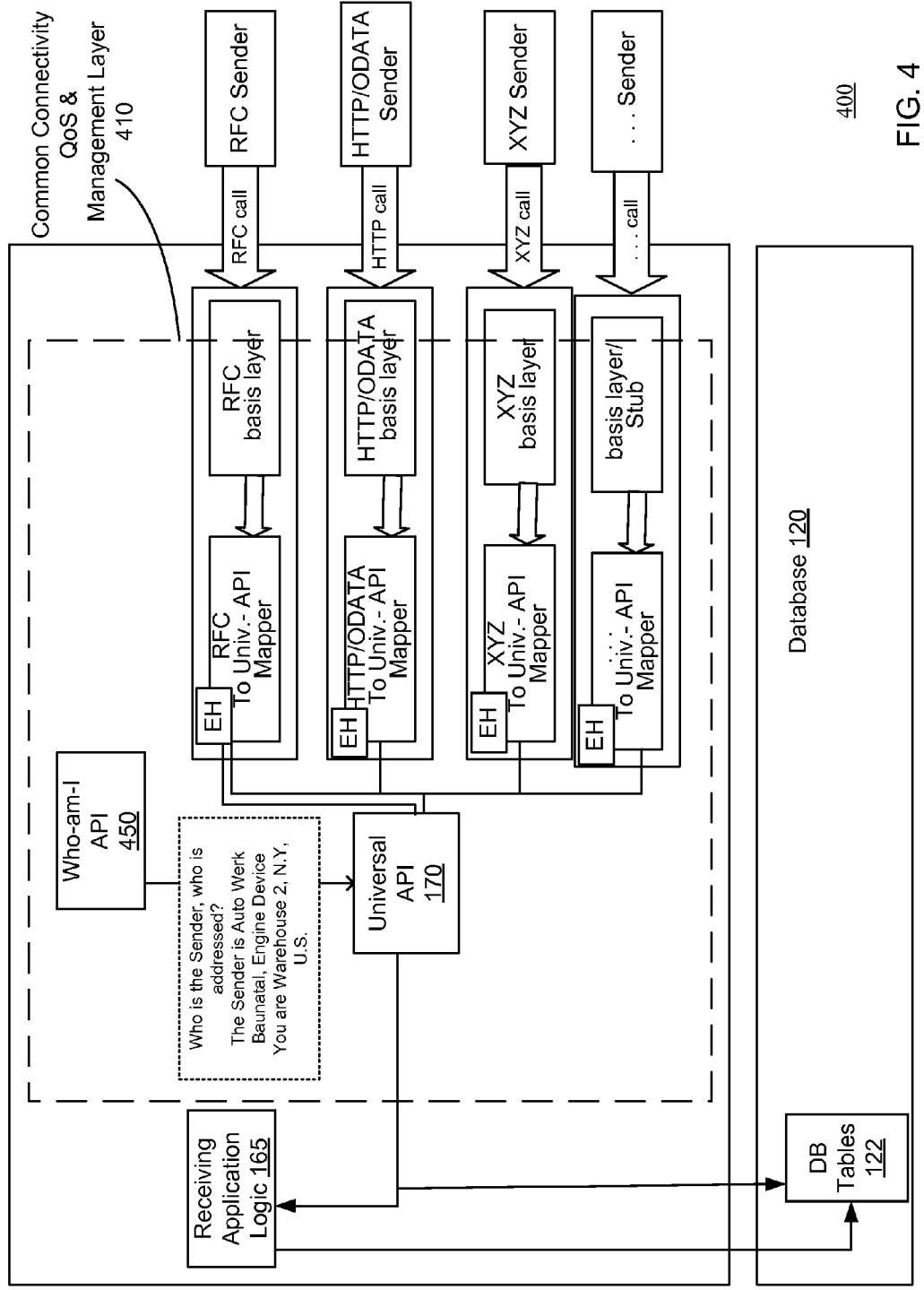
FIG. 4 is a block diagram illustration of an example implementation of a semantic addressing approach on the computing platform of FIG. 2 in the receiving-data scenario, in accordance with principles of the disclosure herein.

It will be understood that the example common management layers in FIGS. 1 and 2 corresponding to the data-sending scenario and data-receiving scenario, respectively, are labeled differently i.e. as "110" and "210", for convenience in the description. A single common management layer in a computing platform may include the elements of the two example common management layers 110 and 210 shown in the figures and provide connectivity services under both the data-sending and data-receiving scenarios. Further, the common management layer may include additional elements or modules related to managing or providing quality of services for the various connectivity types. FIGS. 3 and 4 show, for example, common management layers 310 and 410 that include additional modules or elements (e.g., Who-am-I API 350, LOGICAL RECEIVER DETERMINATION-API 360, and Who-Is-who API 450, etc.) that relate to "addressing" aspects of data or messages sent or received over the various data connection types supported by computing platform 100.

The additional modules or elements, which may be included in the common management layer of computing platform 100, may be based on a semantic addressing approach in which an addressable entity for a data connection is, for example, an application entity. This application-centric approach may be contrasted with other addressing approaches that involve addressing a system or a client via technical entities such as RFC Destinations or URLs. The semantic addressing approach of this disclosure may be applicable to application-level entities and more fine-granular entities than a system or a client. Further, the common management layer of computing platform 100 may centrally implement the semantic addressing approach over diverse data connections independent of the specific connectivity types of the data connections.

An example addressing problem, which may be referred to herein in the subsequent description, may relate to data communications between entities on a computer system where the entities are follows: Organizational units 1 and 2 are connected via a computer system and may be exposed on the system by their semantic identities (e.g., 'Company Sales Office Germany North' and 'Company Sales Office Germany South', respectively). A customer of organization unit 2 may have the semantic identity: 'AUTO Plant Baunatal Engine Device.' However, the customer may be identified at unit 2 only as a URL/RFC Destination on the system.

In an example solution based on the semantic addressing approach, the entities (e.g., Company Sales Office Germany South, etc.) may have an assigned semantic identity or 'Identifiably Business Context' (IBC) name, which may, for example, be created by entity owners (e.g. applications, customers, line of business (LOBs), etc.). An example IBC name may be a tuple, which includes entity identifying-information such as: the postal address, phone number, e-mail address of the business context or a corresponding contact person, etc. The IBC name or tuple of an entity may be exported out of the system or environment where it was created and may be shared (e.g., by mail) or otherwise imported into the sending or addressing system, application, or environment from where the IBC-named entity needs to be addressed. The IBCs may be the basis for technical and logical receiver determination on computing platform 100.

In the solution based on the semantic addressing approach, technical parameters for a data connection between the entities on the system may be derived from the tuples of the semantic identity of a sending or "addressing" entity (e.g., application, system, etc.) and the semantic identity of a receiving or "to-be-addressed" entity (e.g., application, system, etc.).

In the sending-data scenario (FIG. 1), knowledge of the IBC tuples of the sender and receiver entities may allow a technical determination of the connectivity that may be provided or implemented between the sender and receiver. The technical determination may include determination of, for example, the connectivity type (e.g., RFC), the corresponding message assembler module (e.g., RFC Message Assembly module), the function module (e.g., RFC-receiver) to be called on the receiver side, and security settings, etc.

In case logical routing is needed, it may be possible to generate routing rules based on application defined criteria. For example, in the case a customer located in Germany places a purchase order for a book via an application hosted on the computing platform, the purchase order may be logically routed to an IBC: 'Warehouse Germany'. In contrast, in the case the customer is located in the U.S., the purchase order may be logically routed to the IBC: 'Warehouse U.S.'

Sending-Data Scenario

FIG. 3 shows an example implementation 300 of the semantic addressing approach on computing platform 100 in the sending-data scenario described above with reference to FIG. 1. In implementation 300, common management layer 310 of computing platform 100 may include APIs (e.g., Who-am-I API 350 and Logical Receiver Determination API 360) that are configured to implement the semantic addressing approach. IBC data for the APIs may be hard coded. In example implementations of computing platform 100, IBC tuple data may, for example, be entered manually in data stores that are accessible to the APIs or computing platform 100. Further the APIs may be configured to generate information about the sender's identity and the receiver's identity by analysis of the IBC tuples data. The APIs may also be configured to generate technical data for the sender-receiver data connection based on the IBC tuples data.

Who-am-I API 350 may, for example, be configured to provide the own or self-identity IBC tuple to the sending entity based on semantic analysis of the IBC tuples data. Further, Logical Receiver Determination API 360 may, for example, be configured to provide receiver identity based on semantic analysis of the IBC tuples data. Even though, the sender may have addressed a system or client technically (e.g., as a URL/RFC Destination, etc.) while sending data, the sender IBC and the receiver IBC may be transferred with the sent data.

In an example illustrating the use of semantic addressing, a business entity with IBC name (WERKS 002, MATNR 4711) may want to send a material delivery order over the computer system via application 160. Who-am-I API 350 may respond to a self-identification request "Who am I (WERKS 002, MATNR 4711)" by entity (WERKS 002, MATNR 4711) at application 160 with the identification information based on semantic analysis of IBC names as follows: "You are 'AUTO Werk Baunatal, Engine Device'". Further, Logical Receiver Determination API 360 may respond to a request for receiver identification (e.g., "Who is my receiver? I am AUTO Werk Baunatal, Engine Device, MATNR to be delivered is 4711, delivery to U.S.") for the material delivery order from entity (WERKS 002, MATNR 4711) with the identification information based on semantic analysis of IBC names as follows: Your receiver is Warehouse 2, NY US.

Receiving-Data Scenario

FIG. 4 shows an example implementation 400 of the semantic addressing approach on computing platform 100 in the receiving-data scenario described above with reference to FIG. 2. In implementation 400, common management layer 410 of computing platform 100 may include APIs (e.g., "Who-is who" API 450) that are configured to implement the semantic addressing approach. As described for the sending-data scenario above, in example implementations of computing platform 100, IBC data for the APIs may be hard coded. IBC tuple data may, for example, be entered manually in data stores that are accessible to the APIs or computing platform 100. Further the APIs may be configured to generate information about the sender's identity and the receiver's identity. The APIs may also be configured to generate technical data for the sender-receiver data connection based on the sender and receiver's IBC tuples data.

Who-is-who API 450 may, for example, be configured to confirm identities of the sending entity and the receiving entity based on semantic analysis of the IBC tuples data. In the example sending-data scenario described above, business entity (WERKS 002, MATNR 4711) may send a material delivery order to an external receiver/common management layer 410 over a RFC channel. Who-is-who API 450 in the common management layer 410 may, for example, upon receipt of the material delivery order, confirm who the sender is and who is the delivery order is addressed to as follows: "The Sender is AUTO Werk Baunatal, Engine Device," and "You are Warehouse 2, N.Y., U.S."

As previously noted with reference to FIG. 3, even though a system or client may be technically addressed by the sender as a URL/RFC Destination, the sent material delivery order may include both the sender's and receiver's IBCs. A receiving application representing several receiving sub-entities in a business system, may be able to distinguish which of the several receiving sub-entities is the intended recipient of the sent material delivery order belongs to (e.g., Organizational Unit 001 or Unit 002) by the semantic address of the receiver (i.e. the receiver IBC name).

It is noted that various semantic addressing APIs and functionalities described above are independent of connectivity types/channels supported by computing platform 100. They can be part of the common management layer on computing platform 100. Further, the functionalities that may be included in the common management layer on computing platform 100 are not limited to those described with reference to FIGS. 1-4. Various implementations of the common management layer may include alternate or additional functionalities that may also be connectivity-type independent. These alternate or additional functionalities may, for example, include APIs to support integration of distributed applications running on diverse systems by combining semantic addressing concepts with information about the technical entities that may be involved. Further, the alternate or additional functionalities may, for example, include APIs for technical and semantic end-to-end monitoring of the distributed applications.

Figure 6:
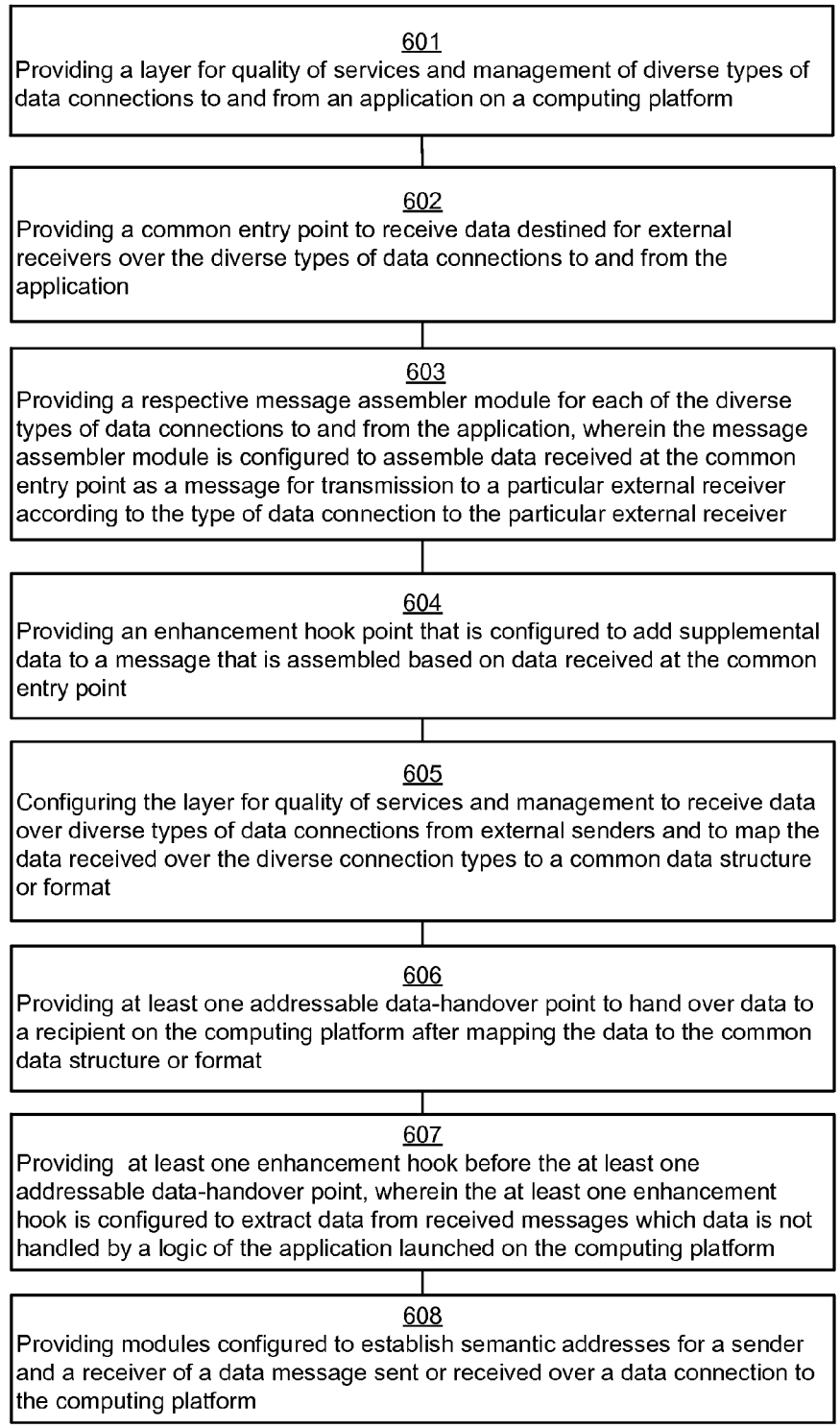
FIG. 6 is a flow diagram of an example method for quality of services and management of diverse data connections to and from an application launched on a computing platform, in accordance with principles of the disclosure herein.

FIG. 6 shows an example method 600 for quality of services and management of diverse data connections to and from an application launched on a computing platform. The diverse types of data connections to and from the application may, for example, include one or more of HTTP, Web Services, OData/REST, OData/HTTP, SAP RFC, and SAP ALE types of data connections.

Method 600 includes providing a layer, in the computing platform, for quality of services and management of diverse types of data connections to and from the application (601) and providing a common entry point to receive data destined for external receivers over the diverse types of data connections to and from the application (602).

Providing a layer, in the computing platform, for quality of services and management of diverse types of data connections to and from the application 601 may include providing a respective message assembler module for each of the diverse types of data connections to and from the application (603). The message assembler module may be configured to assemble data received at the common entry point as a message for transmission to a particular external receiver according to the type of data connection to the particular external receiver. Providing a respective message assembler module for each of the diverse types of data connections to and from the application 603 may includes providing an enhancement hook point that is configured to add supplemental data to a message that is assembled based on data received at the common entry point (604).

Further, method 600 may include configuring the layer for quality of services and management to receive data over any of the diverse types of data connections from external senders and to map the data received over the data connections of diverse connectivity types to a common data structure or format (605), providing at least one addressable data-handover point to hand over data to a recipient on the computing platform after mapping the data to the common data structure or format (606), and providing at least one enhancement hook before the at least one addressable data-handover point, which is configured to extract data from received messages that is not handled by a logic of the application launched on the computing platform (607).

Method 600 may also include providing modules configured to establish semantic addresses for a sender and a receiver of a data message sent or received over a data connection to the computing platform independent of a connectivity type of the data connection.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system, comprising:
a processor;
a memory; and
a computing platform supported by the processor and memory,
wherein the computing platform is configured to provide one or more common services to software applications launched thereon including data connections between the software applications and external data senders/receivers, and
wherein the computing platform includes a layer for management of diverse types of data connections between the software applications launched on the computing platform and external data senders/receivers, the data connections being independent of software application logic or coding.

2. The system of claim 1, wherein the diverse types of data connections include one or more of HTTP, Web Services, OData/REST, OData/HTTP, SAP RFC, and SAP ALE types of data connections.

3. The system of claim 1, wherein the one or more common services include at least one of common error handling, monitoring, asynchronous handling, and addressing for the diverse types of data connections.

4. The system of claim 1, wherein the computing platform includes a common entry point to receive data destined for external receivers over the diverse types of data connections from a particular software application launched on the computing platform.

5. The system of claim 4, wherein the computing platform includes a respective message assembler module for each of the diverse types of data connections, and wherein the message assembler module is configured to assemble data received at the common entry point as a message for transmission to a particular external data receiver according to the type of data connection to the particular external data receiver.

6. The system of claim 5, wherein the respective message assembler module includes an enhancement hook point that is configured to add supplemental data to a message that is assembled based on data received at the common entry point.

7. The system of claim 1, wherein the computing platform is configured to receive data over data connections of diverse connectivity types from external data senders and to map the data received over any of the data connections of diverse connectivity types to a common data structure or format.

8. The system of claim 7, wherein the computing platform includes at least one addressable data-handover point to hand over data to a recipient application on the computing platform after mapping the data to the common data structure or format.

9. The system of claim 8, wherein the computing platform includes at least one enhancement hook point before the at least one addressable data-handover point, and wherein the at least one enhancement hook point is configured to extract data from received messages which data is not handled by a logic of a particular software application launched on the computing platform.

10. The system of claim 1, wherein the computing platform includes modules configured to establish semantic addresses for a sender and a receiver of a data message sent or received over a data connection to the computing platform independent of a connectivity type of the data connection.

11. A method, comprising:
providing, in a computing platform, a layer for management of diverse types of data connections for use by a software application launched on the computing platform, the data connections being independent of software application logic or coding; and
providing a common entry point in the computing platform to receive data destined for external data receivers over the diverse types of data connections from the software application on the computing platform.

12. The method of claim 11, wherein providing diverse types of data connections for use by the software application includes providing, in the computing platform, a respective message assembler module for each of the diverse types of data connections for use by the software application, and wherein the message assembler module is configured to assemble data received at the common entry point as a message for transmission to a particular external data receiver according to the type of data connection to the particular external data receiver.

13. The method of claim 12, wherein providing a respective message assembler module for each of the diverse types of data connections includes providing an enhancement hook point that is configured to add supplemental data to a message that is assembled based on data received at the common entry point.

14. The method of claim 11, wherein providing diverse types of data connections includes configuring the computing platform to receive data from external data senders over the diverse types of data connections and to map the data received over the diverse types of data connections to a common data structure or format.

15. The method of claim 14, wherein providing diverse types of data connections includes providing at least one addressable data-handover point to hand over data to a recipient application on the computing platform after mapping the data to the common data structure or format.

16. The method of claim 15, wherein providing diverse types of data connections includes providing at least one enhancement hook point before the at least one addressable data-handover point, wherein the at least one enhancement hook point is configured to extract data from received messages which data is not handled by a logic of the recipient application launched on the computing platform.

17. The method of claim 15, wherein providing diverse types of data connections includes providing modules configured to establish semantic addresses for a sender and a receiver of a data message communicated over a data connection to the computing platform independent of a connectivity type of the data connection.

18. A non-transitory computer readable medium, comprising:
    instructions capable of being executed on a computer system, which instructions when executed on the computer system generate, in a computing platform:
    a layer for management of diverse types of data connections for use by a software application launched on the computing platform; and
    a common entry point to receive data destined for external data receivers over the diverse types of data connections from the software application.

19. The non-transitory computer readable medium of claim 18, wherein the instructions when executed on the computer system generate a respective message assembler module for each of the diverse types of data connections, and wherein the message assembler module is configured to assemble data received at the common entry point as a message for transmission to a particular external receiver according to the type of data connection to the particular external receiver.

20. The non-transitory computer readable medium of claim 18, wherein the instructions when executed on the computer system configure the computing platform to receive data over the diverse types of data connections from external senders and to map the data received over the diverse types of data connections to a common data structure or format.

* * * * *